United States Patent [19]
Guin

[11] 3,977,713
[45] Aug. 31, 1976

[54] RESILIENT SPARE-WHEEL CARRIER

[76] Inventor: Melvin L. Guin, 226 Travis, NE., Grand Rapids, Mich. 49505

[22] Filed: Sept. 5, 1974

[21] Appl. No.: 503,445

[52] U.S. Cl. ............................ 293/69 R; 224/42.06; 224/42.29
[51] Int. Cl.² ..................... B60R 9/06; B60R 11/00; B60R 19/10; B60R 27/00
[58] Field of Search ........... 224/42.06, 42.12, 42.24, 224/42.21, 42.29; 293/69

[56] References Cited
UNITED STATES PATENTS

| | | | |
|---|---|---|---|
| 1,500,460 | 7/1924 | Larson | 224/42.29 X |
| 1,689,149 | 10/1928 | McCloud | 224/42.06 X |
| 2,709,545 | 5/1955 | Cryer | 224/42.06 X |
| 3,074,751 | 1/1963 | Gerin | 224/42.06 X |

Primary Examiner—Robert J. Spar
Assistant Examiner—Howard Beltran
Attorney, Agent, or Firm—Glenn B. Morse

[57] ABSTRACT

A spare-wheel carrier is mouned on the front of a truck in a forward position permitting adequate air circulation to the radiator. The carrier has a lower member bridging across between laterally-spaced securing points on the frame of the truck, and also has an upper bearing member engaging preferably the front of the bumper. The wheel mount is resiliently supported in the carrier structure to function as a shock absorber, and is preferably rotatable.

2 Claims, 6 Drawing Figures

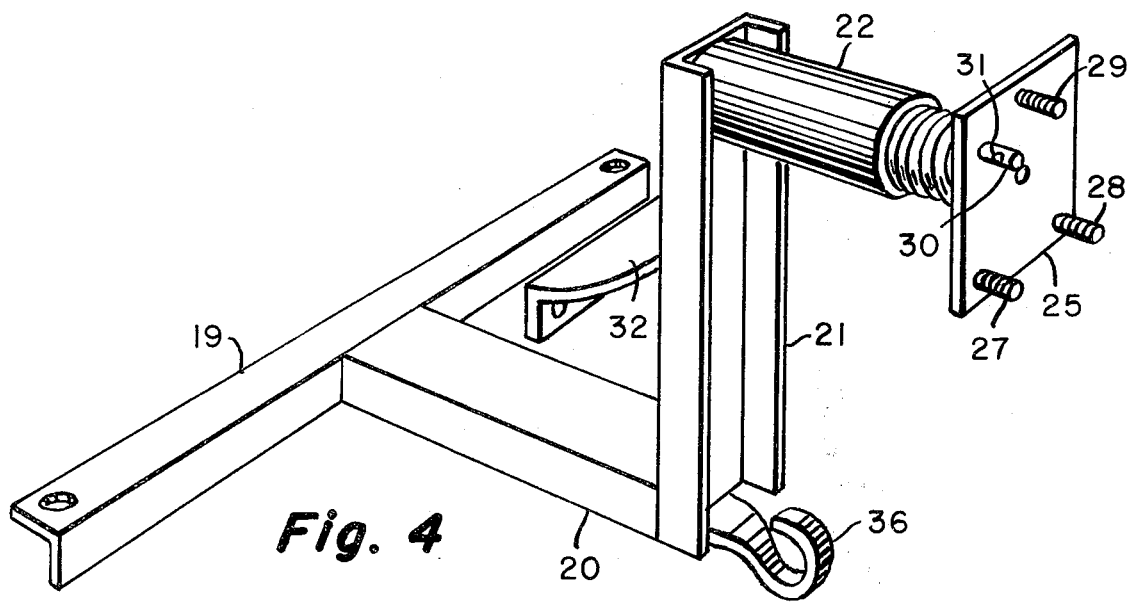
Fig. 4
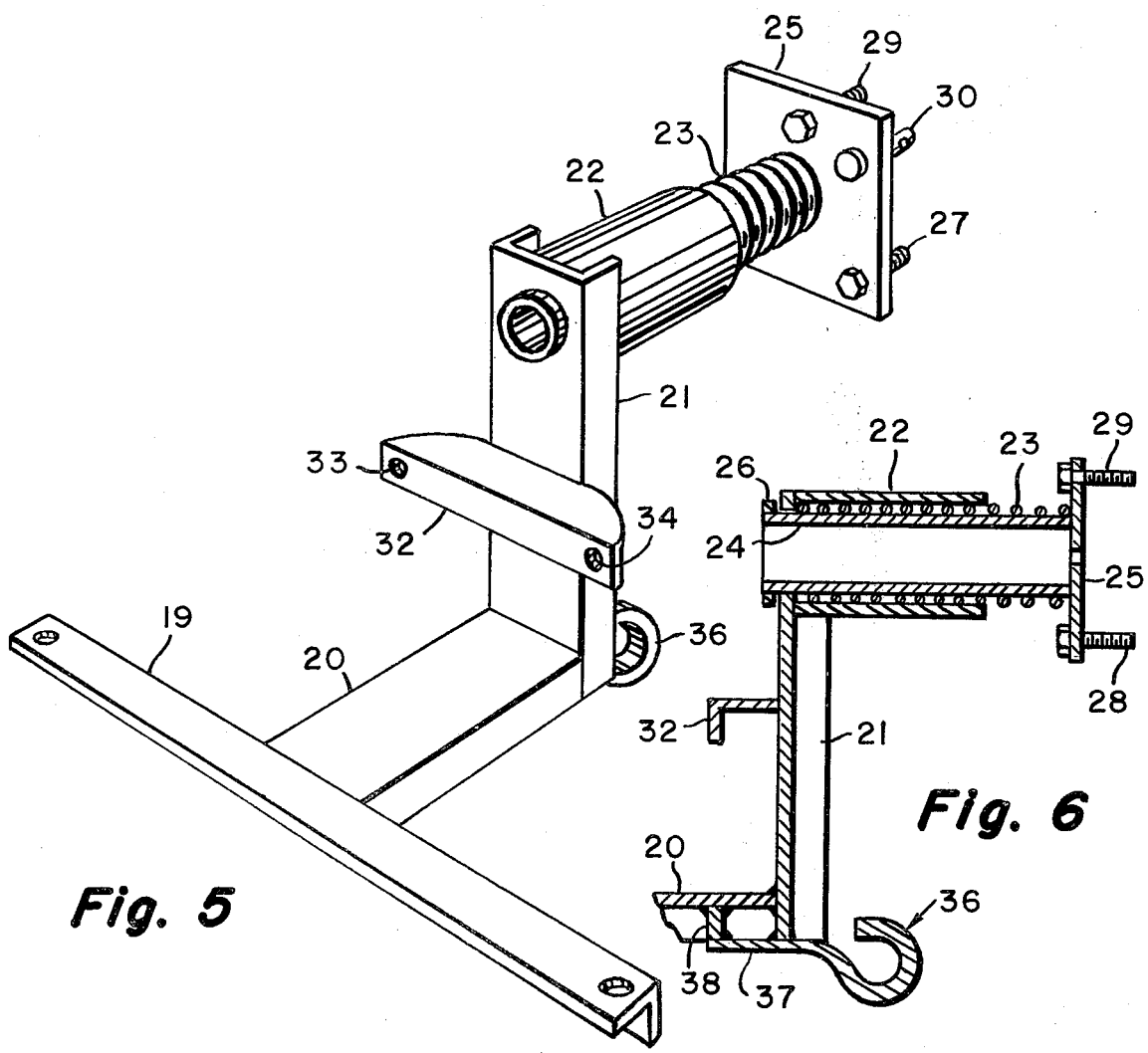
Fig. 5
Fig. 6

RESILIENT SPARE-WHEEL CARRIER

BACKGROUND OF THE INVENTION

Space is always at a premium in commercial vehicles, and the storage of the spare wheel has always been a problem. Placement in a generally horizontal plane underneath the cargo deck presents a lot of interference problems, and any use of the deck area reduces the freight-carrying capacity. This situation has led to the mounting of spare wheels on the front of the vehicle in a generally vertical plane perpendicular to the direction of vehicle movement. Experience has established that a wheel can be placed in this position in front of the radiator without seriously interfering with the cooling air flow if enough space between the wheel and the radiator grille is provided. About a foot of space, in the usual case, appears to be adequate. Such an arrangement, however, obviously provides a structural problem in the support of the wheel. The wheel becomes the most forward point on the vehicle, and thus is the first point contacted by the vehicle in the event of either crash conditions or in pushing other vehicles. In previous mounting arrangements, the carrier has shown an objectionable tendency to fold backward rather easily on contact with any form of obstruction, thus minimizing what would otherwise be a strong safety feature in protecting the frontal area of the truck. It should be noted here that the placement of the spare wheel in a vertical transverse plane has the desirable feature of presenting the side of the tire as the initial contacting surface with any object. While the resilience of this arrangement is desirable, the well-known frictional characteristics of tire material have a tendency to produce a rotation of the spare wheel about a front-rear axis if the tire is contacting the foreign object (as it usually does) at a position below or above the axis, and any relative transverse motion exists between the front of the truck and the object bearing against the front of the spare wheel. This condition is very frequent when a truck is pushing another vehicle. The engagement of the spare wheel with either the bumper of the pushed vehicle or with the tail gate area will produce this type of rotation if there is any lateral shifting of position between the two vehicles.

Pushing or collision forces applied to the spare wheel carrier must be absorbed or dissipated either through (a) resilient deflection of the components, or (b) structural deformation. Where the absorption of energy can take place over a considerable distance, it is obvious that the intensity of the forces involved can be vastly reduced. It would be highly desirable to provide a sufficient energy absorption to keep the forces involved below the point at which permanent deformation of the supporting structure occurred.

SUMMARY OF THE INVENTION

The spare wheel carrier has a lower member adapted to be secured to the frame of the truck at laterally-spaced securing points. The structure of the carrier extends from this member forwardly and upwardly to a portion carrying the wheel mount, which is preferably resilient in a front-rear direction, and rotatable with respect to the fixed structure of the carrier. An upper bearing member is disposed between the wheel mount and the lower member, in a position to engage the bumper of the truck. The bumper will normally have a standard pattern of holes for receiving fastenings for a license plate, and certain of these holes are utilized for securing the upper bearing member to the bumper. The vertical spacing between the bumper and the lower carrier member provides excellent resistance against a tendency to fold the carrier backward on contact of the spare wheel with an obstruction.

DESCRIPTION OF THE DRAWINGS

FIG. 4 is a perspective view of the carrier alone, detached from the truck.

FIG. 5 is a perspective view from the opposite side of the device from that appearing in FIG. 4.

FIG. 6 is a section on a vertical front-rear plane through the central portion of the frontal part of the carrier.

DESCRIPTION OF THE PREFERRED EMBODIMENT

Figure 1:
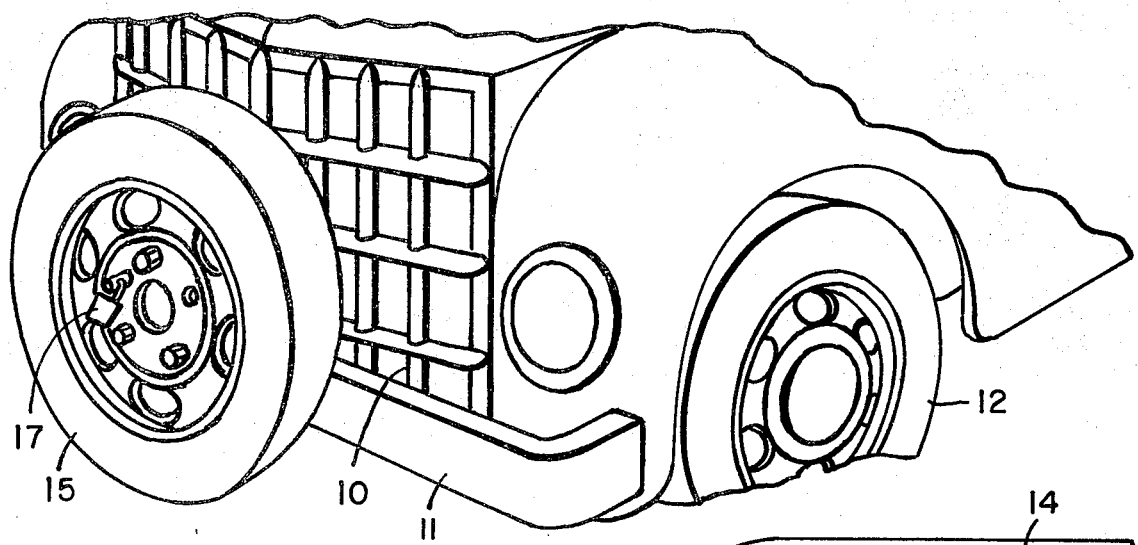
FIG. 1 is a perspective view of the frontal area of a pickup truck, with the spare wheel carrier in position.
Figure 2:
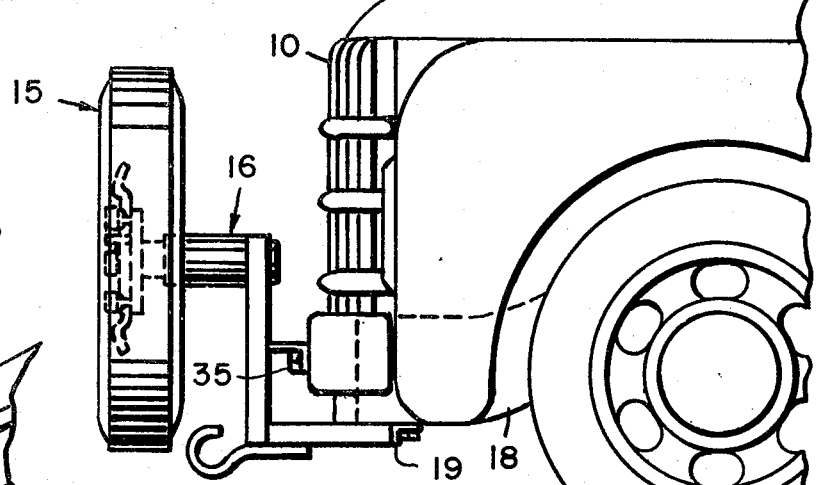
FIG. 2 is a side elevation of the installation appearing in FIG. 1.
Figure 3:
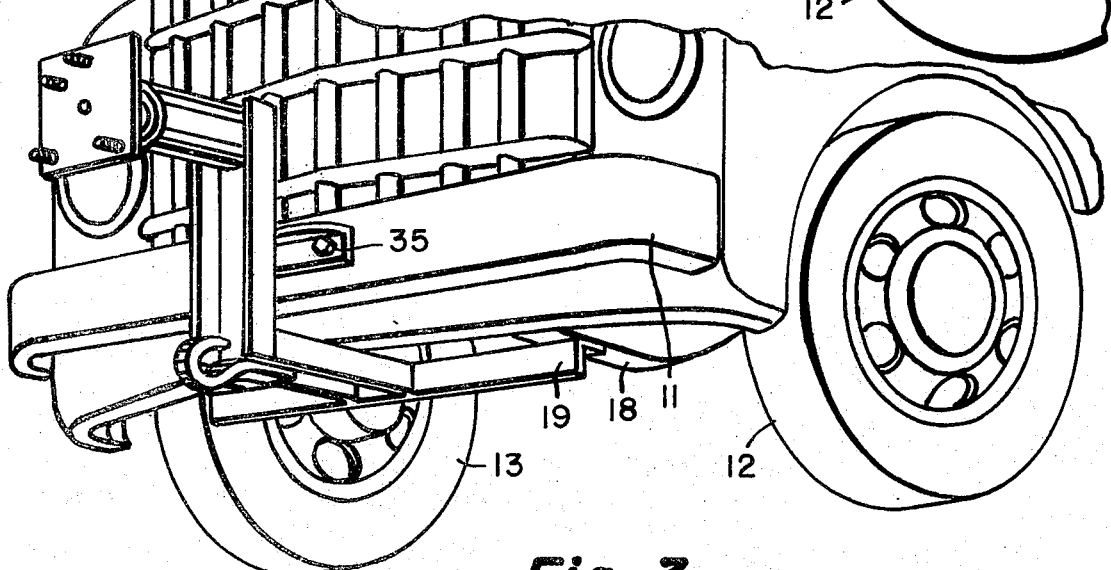
FIG. 3 is a perspective view of the spare wheel carrier with the wheel removed.

The front end of the truck appearing in FIGS. 1–3 has a a radiator grille indicated at 10, and a front bumper 11. The active front wheels are indicated at 12 and 13, and the hood is referred to at 14. The vehicle is standard with respect to these components. The spare wheel 15 is mounted on the carrier generaly indicated at 16, and secured there by the presence of the padlock 17.

The frame of the vehicle is standard, and has relatively heavy laterally-spaced longitudinal members as shown at 18 on opposite sides of the vehicle. These are used as securing points for the lower transverse member 19 of the carrier, which may be secured in position by bolts or by welding. The structure of the carrier appears most clearly in FIGS. 4–6. A lower frontal member 20 extends forwardly from the transverse bridging member 19, and these components are preferably securely welded together. The vertical member 21 is securely welded to the front of the member 20, and extends upward to provide support for the tubular housing 22 receiving the compression spring 23 and the inner tubular shaft 24. The mounting plate 25 is welded to the front of the shaft 24, and a retaining collar 26 is welded to the rear extremity of this member after the unit has been assembled as shown in FIG. 6. The plate 25 has a group of three threaded studs 27–29 projecting forwardly for interengagement with a standard wheel hub. These studs are threaded for receiving standard wheel nuts. The fourth projection, indicated at 30, is also disposed to enter one of the standard holes in the wheel hub, and has a cross-hole 31 for receiving the padlock 17.

A bearing member 32 is welded to the vertical member 21 in a position opposite the bumper 11. The holes 33 and 34 at the opposite ends of the member 32 are disposed for alignment with the standard holes normally appearing in the bumper 11 for receiving a license plate, which is usually mounted in some other area when a carrier of this type is used. The lower transverse member 19, lower frontal or horizontal member 20, vertical member 21 and bracing member 32 together constitute a rigid frame structure while the tubular housing 22, tubular shaft 24 and plate 25 constitute a tire and wheel mounting assembly. The support of the vertical member 21 at vertically spaced points represented by the transverse bridging member 19 and the bearing member 32 provides an excellent resistance to backward rotation of the structure on encountering an obstruction. Forces applied to the bumper are thus limited to a direct rearward action, without generation of a substantial amount of twist about a transverse horizontal axis. The resilience provided by the spring 23 permits a considerable degree of energy absorption without permanent deformation of the structure. The frictional interengagement of the opposite ends of this spring with the plate 25 and the web of the channel beam constituting the vertical member 21 generates a desirable degree of frictional restraint against the rotation of the spare wheel 15, while still permitting enough freedom of rotation to accommodate lateral shifting in the relative position of the pushing and pushed vehicles. The fastening bolts engaging the holes 33 and 34, and shown at 35 in FIGS. 2 and 3, are standard, and are normally not heavily stressed. The sole function of these bolts is normally to assure the relative vertical position of the carrier structure, as the primary force transmitted at this point is in bearing directly against the front of the bumper 11. The towing hook 36 is a convenience, but functions also as a reinforcement of the welded junction between the members 20 and 21. The extension 37 of the hook may be either welded directly to the web of the channel-shaped member 20 (by inclining the portion 37), or an intervening block 38 may be applied as shown in FIG. 6. In either case, the welding at these junctions should be thorough.

I claim:

1. A rack for mounting a spare tire and wheel on a vehicle having a frame and a front bumper, comprising:
    a rigid frame structure, adapted to be affixed to said vehicle frame and said bumper having a vertical member extending forwardly and upwardly of said bumper;
    a tubular housing secured to and projecting horizontally forward from said vertical member adjacent the upper end thereof;
    a tire and wheel mounting assembly including a mounting plate having a plurality of studs secured to and projecting from one face thereof and spaced so as to align with standard wheel mounting holes and a tubular shaft secured to and projecting from the opposite face of said plate, said shaft being received in said tubular housing and capable of sliding and rotational movement therein;
    spring means biasing said mounting assembly forwardly relative to said housing; and
    retainer means limiting the forward movement of said mounting assembly relative to said housing.

2. The rack of claim 1 wherein said frame structure further includes;
    a transverse member adapted to be rigidly affixed to said vehicle frame at a location rearward of said front bumper;
    a horizontal member secured to and projecting forwardly from said transverse member to a point forward of said bumper, the lower end of said vertical member being secured to the forward end of said horizontal member; and
    a bracing member secured to said vertical member intermediate the ends thereof and adapted to bear against the forward face of said bumper.

* * * * *